(12) United States Patent
Rose et al.

(10) Patent No.: US 6,814,984 B2
(45) Date of Patent: Nov. 9, 2004

(54) FROZEN BIOCIDAL COMPOSITIONS AND METHODS OF USE THEREOF

(75) Inventors: David C. Rose, Henderson, NC (US); Lawrence J. Ventura, Fuquay Varina, NC (US)

(73) Assignee: Clean Water International LLC, Richmond, VA (US)

( * ) Notice: Subject to any disclaimer, the term of this patent is extended or adjusted under 35 U.S.C. 154(b) by 0 days.

(21) Appl. No.: 10/071,687

(22) Filed: Feb. 8, 2002

(65) Prior Publication Data

US 2002/0176896 A1 Nov. 28, 2002

Related U.S. Application Data

(60) Provisional application No. 60/267,530, filed on Feb. 9, 2001.

(51) Int. Cl.[7] .................. A01N 25/00; A01N 25/22; A01N 59/00; A01N 59/08; A23L 3/34
(52) U.S. Cl. .................. 424/662; 424/405; 424/489; 424/613; 424/616; 424/657; 424/658; 424/659; 424/660; 424/661; 424/663; 424/664; 424/665; 424/667; 424/668; 424/669; 424/670; 424/671; 424/673; 424/675; 424/676; 424/677; 424/678; 424/679; 424/680; 424/681; 424/685; 424/715; 514/714; 514/970; 426/68; 426/320; 426/327; 426/532; 252/186.42; 252/186.43; 252/187.1; 252/187.2; 252/187.23; 252/187.31; 422/37
(58) Field of Search .................. 424/405, 489, 424/613, 616, 657–665, 667–671, 673, 675–681, 685, 715; 422/37; 426/68, 320, 327, 532; 514/714, 970; 252/186.42, 186.43, 187.1, 187.2, 187.23, 187.31

(56) References Cited

U.S. PATENT DOCUMENTS

| | | |
|---|---|---|
| 2,271,242 A | 1/1942 | Altenburger |
| 2,379,335 A | 6/1945 | Baker |
| 2,575,670 A | 11/1951 | MacMahon |
| 3,278,447 A | 10/1966 | McNicholas |
| 3,585,147 A | 6/1971 | Gordon |
| 3,748,152 A | 7/1973 | Webster |
| 3,767,826 A | 10/1973 | Fruin |
| 3,873,696 A | 3/1975 | Randeri et al. |
| 4,201,756 A | 5/1980 | Saeman et al. |
| 4,284,653 A | 8/1981 | Shigeoka et al. |
| 4,296,103 A | 10/1981 | Laso |
| 4,317,814 A | 3/1982 | Laso |
| 4,574,084 A | 3/1986 | Berger |
| 4,690,772 A | 9/1987 | Tell et al. |
| 4,880,638 A | 11/1989 | Gordon |
| 4,986,990 A | 1/1991 | Davidson et al. |
| 5,424,078 A | 6/1995 | Dziabo et al. |
| 5,650,446 A | 7/1997 | Wellinghoff et al. |
| 5,695,814 A | 12/1997 | Wellinghoff et al. |
| 5,707,739 A | 1/1998 | Wellinghoff et al. |
| 5,830,511 A | 11/1998 | Mullerat et al. |
| 5,914,120 A | 6/1999 | Wellinghoff et al. |
| 5,950,435 A | 9/1999 | Kaizuka |
| 5,974,810 A | 11/1999 | Speronello |
| 6,004,587 A | 12/1999 | Mullerat et al. |
| 6,063,425 A | 5/2000 | Kross et al. |
| 6,099,855 A | 8/2000 | Mullerat et al. |
| 6,120,731 A | 9/2000 | Kross et al. |
| 6,123,966 A | 9/2000 | Kross et al. |
| 6,328,909 B1 * | 12/2001 | Kross et al. ........... 252/187.21 |

FOREIGN PATENT DOCUMENTS

GB    1 206 574    9/1970

OTHER PUBLICATIONS

Federal Register, vol. 64, No. 156, Aug. 13, 1999; Retrieved from http://www.fda.gov on Jun. 8, 2004.*

* cited by examiner

*Primary Examiner*—John Pak
(74) *Attorney, Agent, or Firm*—Troutman Sanders LLP

(57) ABSTRACT

The present invention is directed to frozen biocidal compositions. Specifically, the biocidal compositions comprise a frozen aqueous solution of a plurality of ions selected from the group consisting of halide and oxyhalide ions. The frozen biocidal compositions are useful in preserving or extending the shelf-life of perishable articles.

19 Claims, 8 Drawing Sheets

FIG. 7

| TREATMENT | DAY 0 SKIN | EYES | GILLS | DAY 2 SKIN | EYES | GILLS | DAY 4 SKIN | EYES | GILLS | DAY 6 SKIN | EYES | GILLS |
|---|---|---|---|---|---|---|---|---|---|---|---|---|
| CONTROL-1 | 5 | 5 | 5 | 5 | 5 | 5 | 5 | 5 | 5 | 4 | 3 | 2 |
| CONTROL-2 | 5 | 5 | 5 | 5 | 5 | 4 | 5 | 5 | 4 | 4 | 3 | 2 |
| CONTROL-3 | 5 | 5 | 5 | 5 | 5 | 4 | 5 | 5 | 3 | 5 | 3 | 2 |
| 1 MINUTE 61 ppm-1 | 5 | 5 | 5 | 5 | 5 | 5 | 5 | 4 | 5 | 5 | 3 | 2 |
| 1 MINUTE 61 ppm-2 | 5 | 5 | 5 | 5 | 5 | 5 | 5 | 4 | 5 | 5 | 3 | 3 |
| 1 MINUTE 61 ppm-3 | 5 | 5 | 5 | 5 | 5 | 4 | 5 | 4 | 4 | 5 | 3 | 2 |
| 1 MINUTE 92 ppm-1 | 5 | 5 | 5 | 5 | 5 | 5 | 5 | 4 | 4 | 4 | 3 | 2* |
| 1 MINUTE 92 ppm-2 | 5 | 5 | 5 | 5 | 5 | 5 | 5 | 4 | 4 | 5 | 3 | 3 |
| 1 MINUTE 92 ppm-3 | 5 | 5 | 5 | 3* | 5 | 5 | 5 | 4 | 4 | 5 | 3 | 3 |
| 1 MINUTE 183 ppm-1 | 5 | 5 | 5 | 5 | 5 | 4 | 5 | 4 | 4 | 5 | 4 | 2 |
| 1 MINUTE 183 ppm-2 | 5 | 5 | 5 | 5 | 5 | 4 | 5 | 4 | 3 | 4 | 3 | 2 |
| 1 MINUTE 183 ppm-3 | 5 | 5 | 5 | 5 | 5 | 5 | 5 | 4 | 3 | 5 | 3 | 3 |
| 1 HOUR 61 ppm-1 | 5 | 5 | 5 | 5 | 5 | 3* | 5 | 4 | 2* | 5 | 3 | 2* |
| 1 HOUR 61 ppm-2 | 5 | 5 | 5 | 5 | 5 | 5 | 5 | 4 | 3* | 4 | 3 | 2 |
| 1 HOUR 61 ppm-3 | 5 | 5 | 5 | 5 | 5 | 3* | 5 | 4 | 3* | 5 | 3 | 2* |
| 1 HOUR 92 ppm-1 | 5 | 5 | 5 | 5 | 5 | 3* | 5 | 4 | 2* | 4 | 3 | 2* |
| 1 HOUR 92 ppm-2 | 5 | 5 | 5 | 5 | 5 | 5 | 5 | 4 | 3 | 5 | 3 | 3 |
| 1 HOUR 92 ppm-3 | 5 | 5 | 5 | 3* | 5 | 3* | 5 | 4 | 3 | 5 | 3 | 3 |
| 1 HOUR 183 ppm-1 | 5 | 5 | 5 | 5 | 5 | 3* | 5 | 4 | 2* | 5 | 3 | 1* |
| 1 HOUR 183 ppm-2 | 5 | 5 | 5 | 5 | 5 | 4 | 5 | 4 | 3 | 5 | 3 | 3 |
| 1 HOUR 183 ppm-3 | 5 | 5 | 5 | 5 | 5 | 5 | 5 | 4 | 4 | 4 | 3 | 3 |

Scale: 1-5 (1 = decomposed, 5 = fresh)
* gill plate not closed tightly

2

FROZEN BIOCIDAL COMPOSITIONS AND METHODS OF USE THEREOF

CROSS-REFERENCE TO RELATED APPLICATIONS

This application claims the benefit of Provisional Application Ser. No. 60/267,530, filed Feb. 9, 2001, which is incorporated herein by reference in its entirety.

FIELD OF THE INVENTION

The present invention relates to frozen biocidal compositions useful in preserving perishable articles and, in particular, frozen biocidal compositions comprising a sodium chlorite solution.

BACKGROUND OF THE INVENTION

The use of various chlorine-containing compounds as biocidal agents is known. The literature contains references to the use of chlorine gas, hypochlorites, and chlorine dioxide as materials that can be used to kill microorganisms. A number of patents teach that chlorine dioxide is an effective microbicide, and that it has powerful and effective oxidizing characteristics useful in killing various microorganisms when used in various applications, such as surface disinfecting, water treatment, wound healing, etc. However, chlorine dioxide has many shortcomings. For example, it is a potentially hazardous material that is generally difficult to produce and apply where needed.

Preservation of perishable articles is a major concern for a number of industries, including the agriculture, fishing, and meat-related industries. During the time of harvesting, catching, transporting, and/or storage of perishable articles, particularly food articles, pathogenic and spoilage bacteria continue to multiply exponentially.

Many agents have been tested as potential biocides for use against such spoilage. Most methods incorporate, alone or in combination, various mechanical, chemical, electrical, etc. means, including the use of ice or refrigeration, protective atmospheres and packaging, ionizing radiation, and the use of various chlorine-containing or chlorine-derived compounds. Such compounds and methods have met with mixed success, and often exacerbate the original problem, due to the toxicity of such compounds and methods. Another issue is the relatively high cost associated with the use of such known methods.

U.S. Pat. No. 4,880,638, the entire contents of which are incorporated by reference herein, discloses compositions that do not produce measurable amounts of chlorine dioxide, but do generate interactive intermediates. Further, commonly assigned U.S. Pat. No. 5,830,511, the entire contents of which are incorporated by reference herein, discloses the usefulness of a chlorite-containing composition orally administered to livestock in a therapeutic and production method for enhancing feed utilization and decreasing mortality rate in healthy and infected food animals.

There remains a need in the art for a biocidal product suitable for use on perishable articles that is: 1) benign to the perishable article; 2) less expensive; 3) minimally toxic; and 4) at least as effective as known methods of preserving perishables.

SUMMARY OF THE INVENTION

The present invention provides biocidal compositions comprising a frozen aqueous solution containing a plurality of ions selected from the group consisting of halide and oxyhalide ions. More particularly, the present invention is directed to a frozen aqueous solution of a pH-buffered composition comprising halide and oxyhalide ions, wherein the pH of the solution is at least about 6.0 or higher. In one embodiment, the solution comprises water, chlorite ions, chloride ions and chlorate ions. The solution may also include one or more buffering agents and/or chlorine dioxide-inhibiting agents.

The present invention also provides a method of preserving perishable articles. In the method of the invention, a frozen aqueous solution comprising a pH-buffered composition is contacted with a perishable article. The frozen aqueous solution may be in the form of larger solid blocks or in smaller particulate form, such as shaved or crushed ice. In another embodiment, the aqueous solution of the invention is contacted with the perishable article while the solution is in liquid form and thereafter the solution and article are frozen together.

The invention also provides a preserved perishable article comprising a perishable article in contact with a frozen solution of a pH-buffered composition comprising halide and oxyhalide ions, wherein the pH of the solution is at least about 6.0.

BRIEF DESCRIPTION OF THE DRAWINGS

Figure 1:
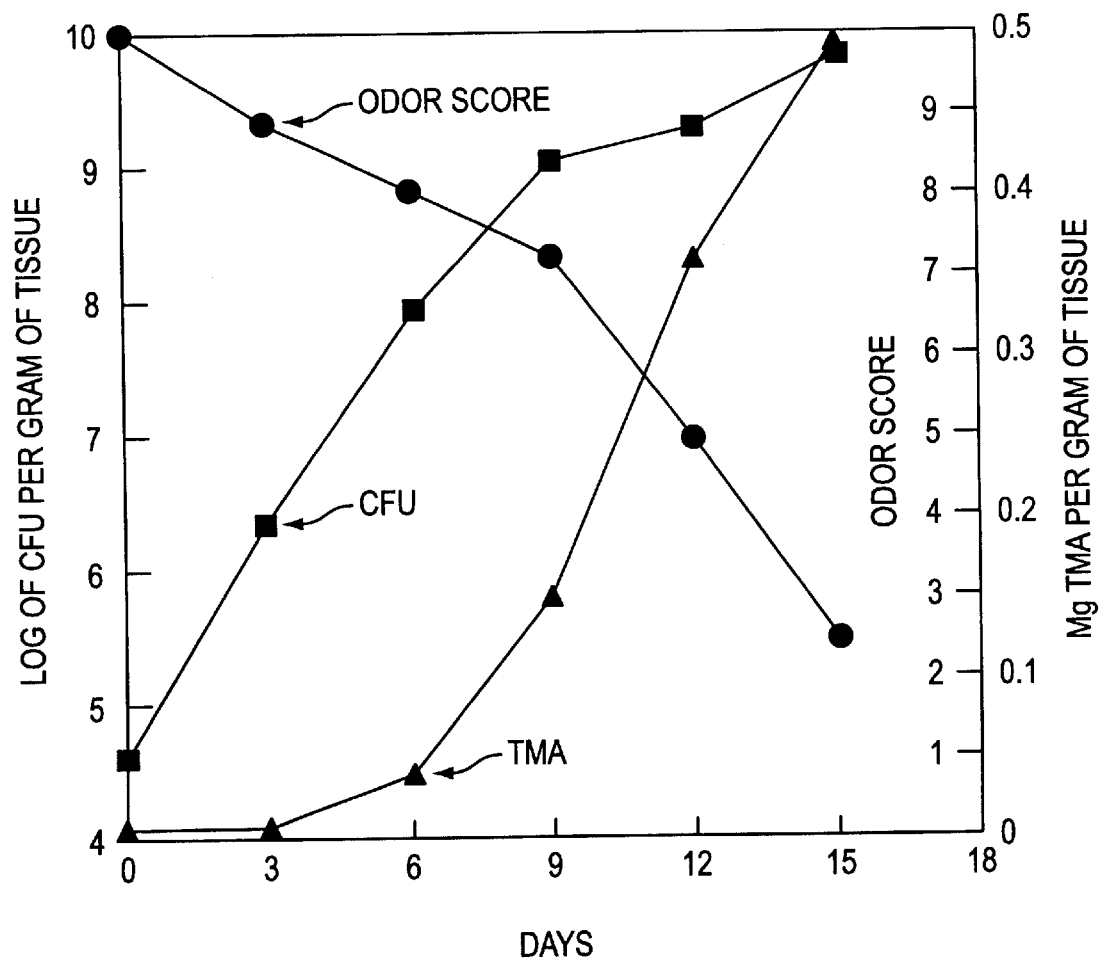
Figure 2:
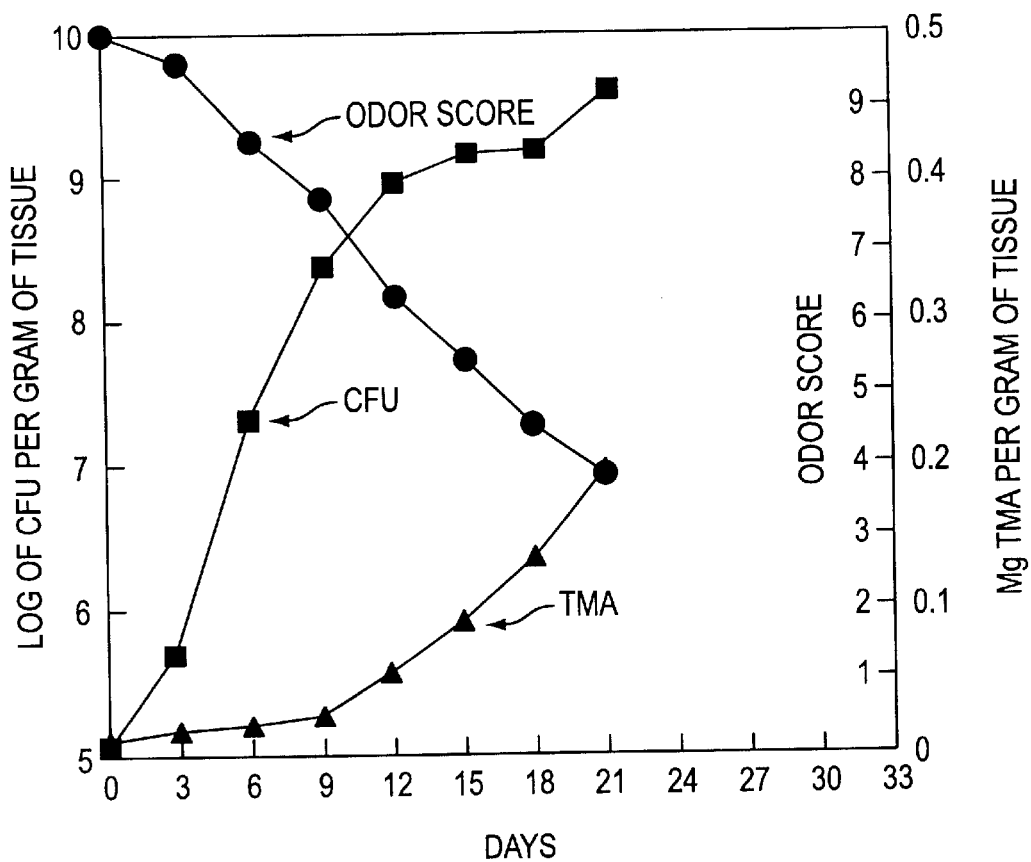
Figure 3:
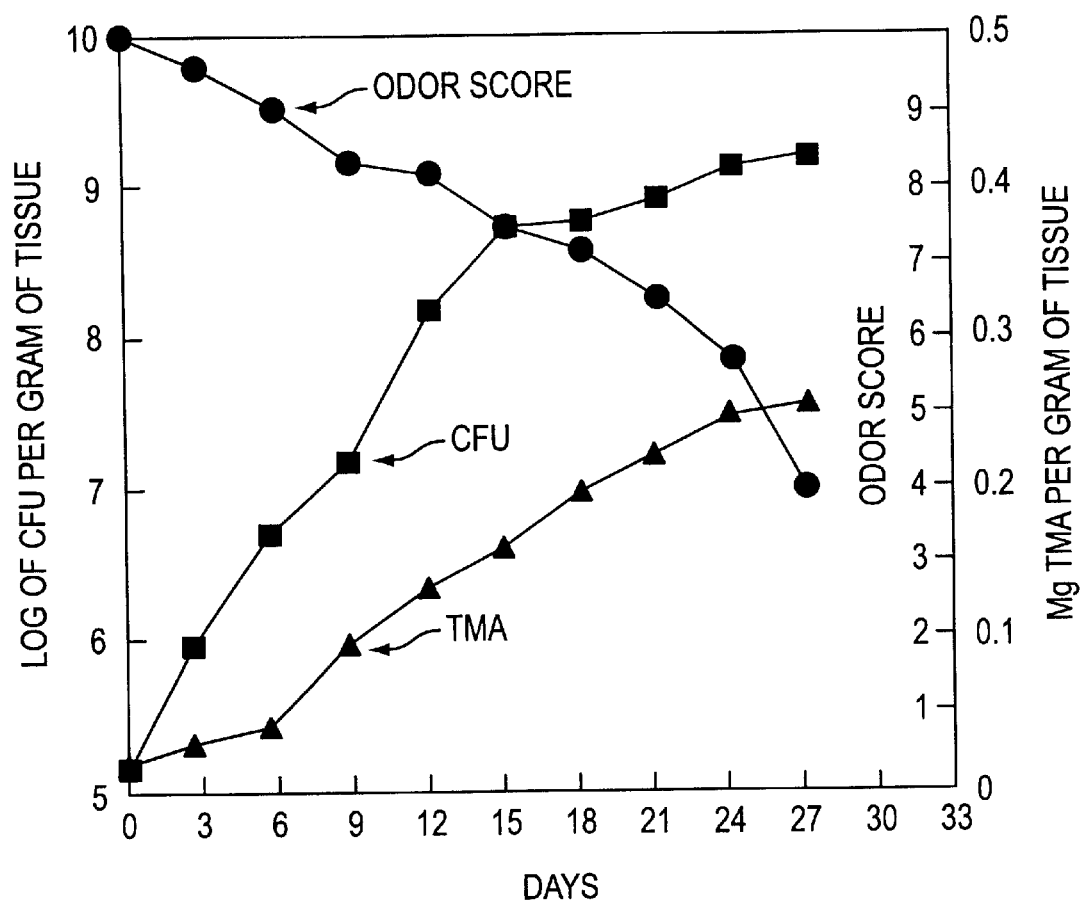
Figure 4:
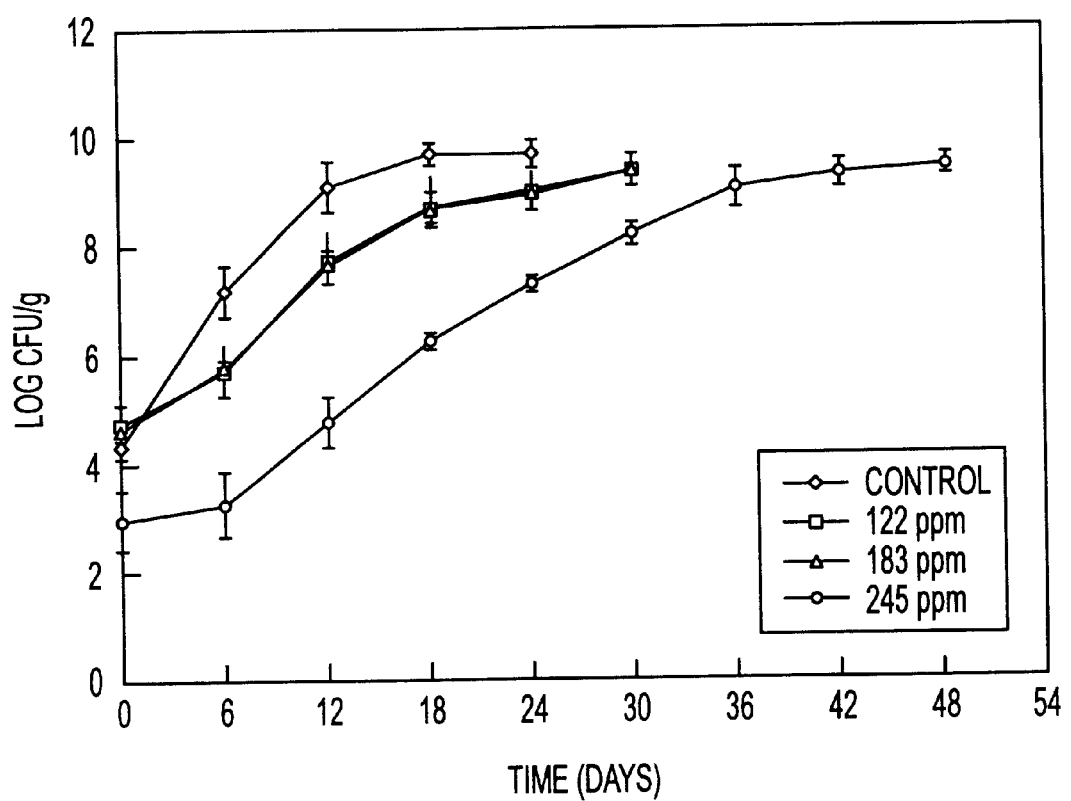
Figure 5:
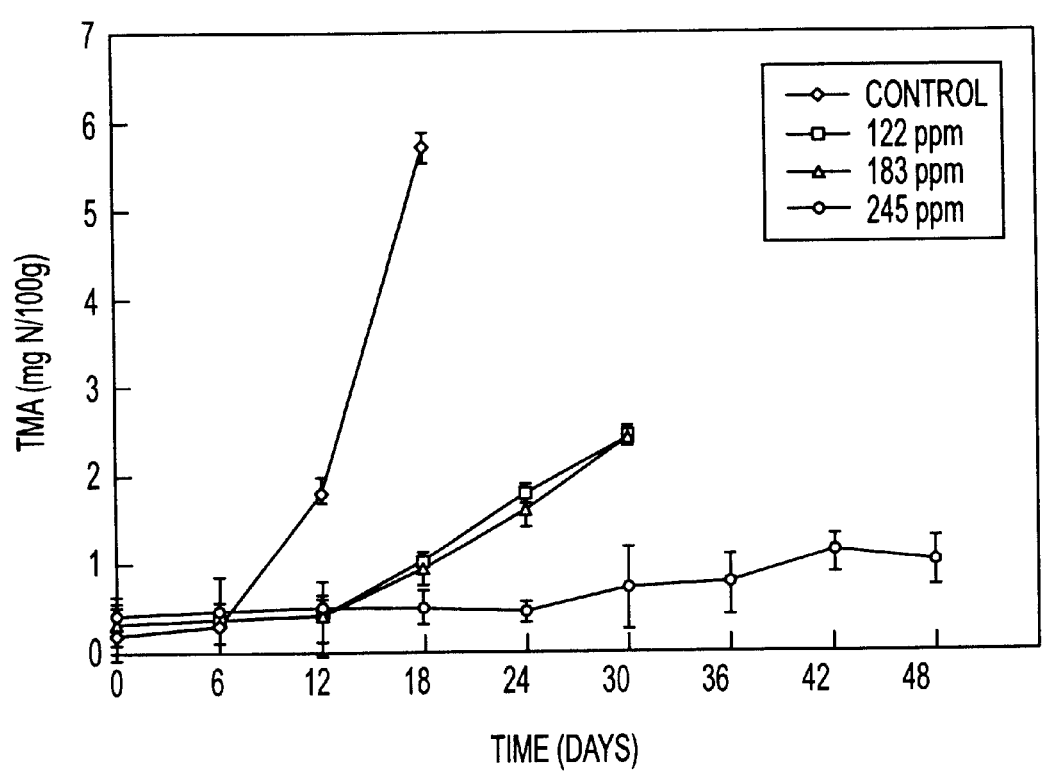
Figure 6:
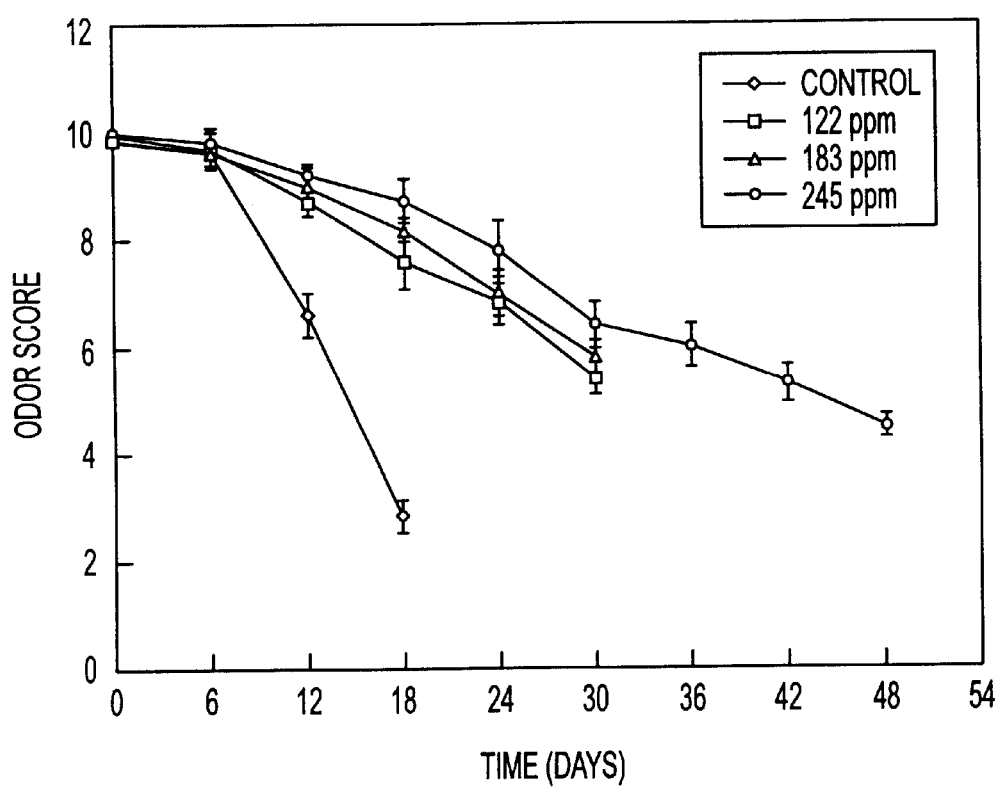
Figure 8:
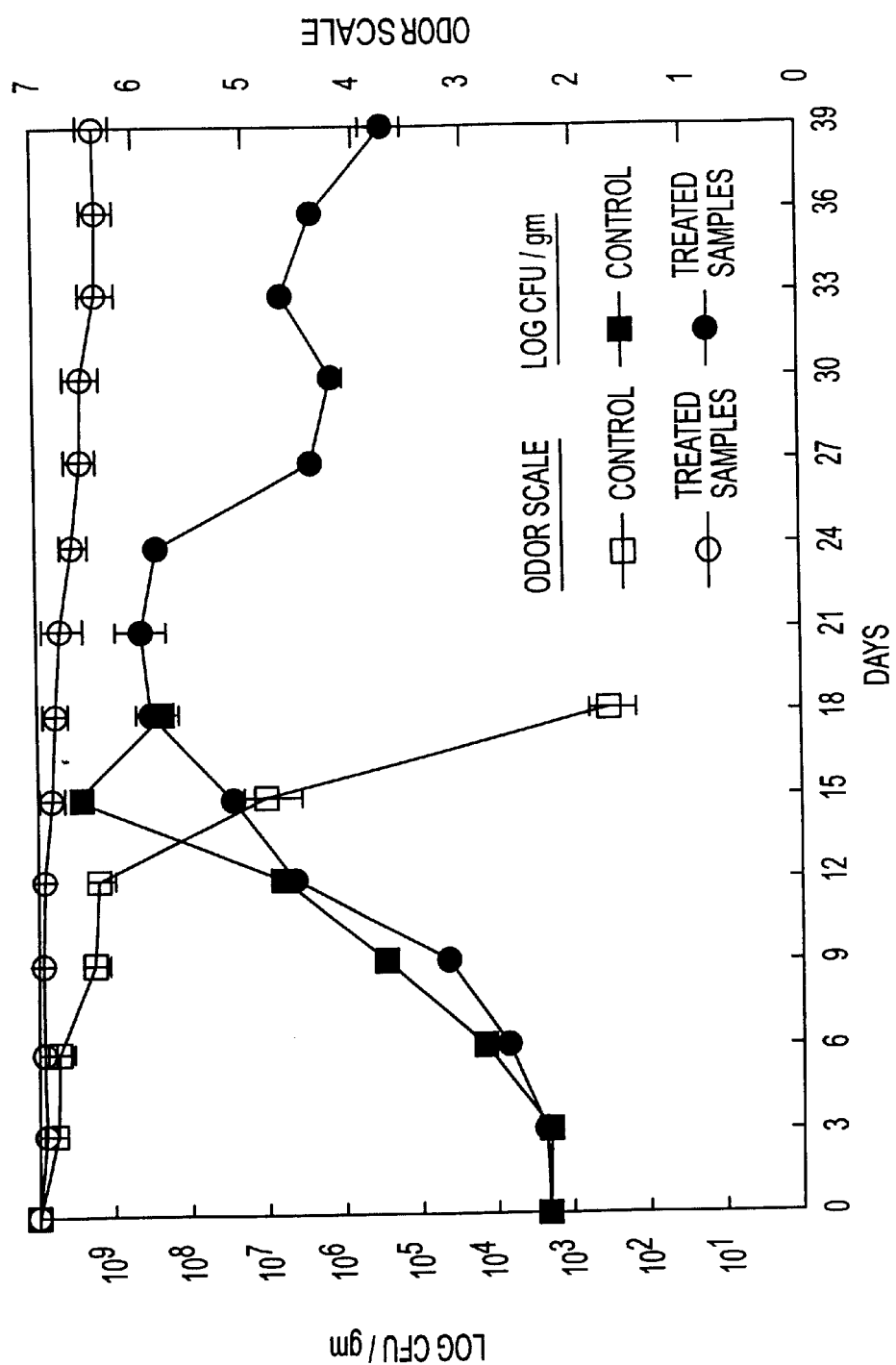

Having thus described the invention in general terms, reference will now be made to the accompanying drawings, which are not necessarily drawn to scale, and wherein:

FIG. 1 is a representation of odor scores, bacterial counts (CFU), and trimethylamine (TMA) values of haddock fillets stored in ice prepared with tap water;

FIG. 2 is a representation of odor scores, bacterial counts, and TMA values of haddock fillets stored in ice prepared from an aqueous biocidal composition containing 122 ppm sodium chlorite;

FIG. 3 is a representation of odor scores, bacterial counts, and TMA values of haddock fillets stored in ice prepared from an aqueous biocidal composition containing 245 ppm sodium chlorite;

FIG. 4 is a representation of mean bacterial counts (CFU) of haddock fillets dipped in a biocidal composition containing 0 ppm, 122 ppm, 183 ppm, and 245 ppm sodium chlorite and stored in ice containing corresponding amounts of the biocidal composition;

FIG. 5 is a representation of mean TMA values of haddock fillets dipped in a biocidal composition containing 0 ppm, 122 ppm, 183 ppm, and 245 ppm sodium chlorite and stored in ice containing corresponding amounts of the biocidal composition;

FIG. 6 is a representation of mean odor scores of haddock fillets dipped in a biocidal composition containing 0 ppm, 122 ppm, 183 ppm, and 245 ppm sodium chlorite and stored in ice containing corresponding amounts of the biocidal composition;

FIG. 7 is a representation of visual scores of hybrid striped bass dipped in chilled aqueous biocidal compositions containing 61 ppm, 92 ppm, and 183 ppm sodium chlorite; and FIG. 8 is a representation of odor scores and bacterial counts of chicken breasts stored in ice prepared from an aqueous biocidal composition containing 245 ppm sodium chlorite.

DETAILED DESCRIPTION OF THE INVENTION

The present invention now will be described more fully hereinafter with reference to the accompanying drawings. This invention may, however, be embodied in many different forms and should not be construed as limited to the embodiments set forth herein; rather, these embodiments are provided so that this disclosure will be thorough and complete, and will filly convey the scope of the invention to those skilled in the art.

The present invention provides a biocidal composition for preserving perishable items. As used herein, the term "perishable article(s)" or "perishable item(s)" encompasses anything that can spoil, rot or otherwise become unfit for its intended use, without proper preservation. Examples include food items, such as seafood, meats, vegetables, fruits and other perishables such as transplantable organs and tissues. The term "fish" is intended to encompass, but is not limited to freshwater or saltwater whole fish, fillets and shellfish including shrimp, lobster, and crabs. The term "meat" encompasses, but is not limited to beef, pork, and poultry, including whole, ground, or otherwise processed meats.

The term "biocidal" as used herein refers to the ability of the composition of the present invention to reduce the microbial load, preserve a perishable article, for example, by preventing microbial contamination of the product, or extend overall shelf life by retarding spoilage. Spoilage may occur due to intrinsic chemical and physical changes due to endogenous enzyme activity. It is also well understood that if the microbial contamination load is reduced or avoided, a fresh food product will have a longer shelf life, thus preserving the food for a longer period of time. Biocidal is also intended to include the term biostatic, whereby the microbial load is not reduced, but the microorganisms are unable to multiply or reproduce thereby preventing microbial growth. Therefore the compositions of the present invention will be described as "biocidal compositions." The term "composition" and "solution" are used interchangeably herein.

The instant invention is directed to biocidal compositions in the form of a frozen aqueous solution. U.S. Pat. No. 4,880,638, which is incorporated by reference herein in its entirety, teaches the preparation of liquid aqueous solutions that are suitable for use in forming the frozen solutions of the present invention. However, the solutions described in the '638 patent are further diluted for use in the present invention. As would be understood in the art, the term "aqueous" is intended to refer to the presence of water in the solution. By "frozen" is meant that the solution is in solid form. In other words, the aqueous solution has been cooled until the freezing point of the solution has been reached. Since the frozen solution is primarily water, the frozen solution is generally referred to below as "ice."

In preparing the compositions, sufficient water should be available to dissolve the starting materials. While water is an essential ingredient, it should be understood that other solvents could also be present, such as various alcohols, glycols and related solvents. Typically, the solutions of the invention are dilute, with water being present in an amount of about 70.0 to about 99.999 weight percent (w/w).

The components of the compositions set forth herein exhibit biocidal synergism when mixed in accordance with the procedures and in the concentrations described herein. Although the solutions of the invention include chlorite ions which are known to be useful reagents in the production of chlorine dioxide, the solutions of the invention contain little or no chlorine dioxide because the solution is stabilized so that reaction of the chlorite ion to form chlorine dioxide is inhibited. The biocidal activity of the compositions described herein is achieved without the necessity of producing chlorine dioxide per se.

The aqueous solution of the invention is prepared by mixing water with sources of halide and oxyhalide ions. The halide and oxyhalide ions are present in an amount sufficient to provide biocidal activity. These ion sources preferably include the alkali metal and alkaline earth metal halides and oxyhalides. The biocidal activity of the composition can be improved by adding an appropriate pH adjusting material to adjust the resulting admixture to a pH of at least about 6.0 or higher. Preferably, the pH of the solution is about 6.0 to about 12.0.

According to one embodiment of the invention, the aqueous solution of the invention is formed by mixing water with a source of chlorite ions, a source of chloride ions and a source of chlorate ions. For example, the source of the chlorite ions can include materials such as alkali metal chlorites and the like. Sodium chlorite is preferred in preparing the compositions of this invention because of its availability and solubility in water. Other suitable sources for the chlorite ions include other alkali metal chlorites, alkaline earth metal chlorites, as well as ammonium chlorite.

Suitable sources of chlorate ions include various commercially available chlorates with alkali metal chlorates being preferred. It has been found that sodium chlorate and potassium chlorate work well in producing the compositions of this invention because of their solubility and availability. Other sources of the chlorate ions include alkaline earth metal chlorates and ammonium chlorate.

Suitable sources of chloride ions include various commercially available chlorides with alkali metal chlorides being preferred. Sodium chloride and potassium chloride are preferred because of their low cost and solubility. Alkaline earth metal chlorides and ammonium chlorides can also be used.

If sodium chlorite is used as the source of chlorite ions, the final concentration of the sodium chlorite is about 0.001 to about 14.7 weight percent (w/w), preferably about 0.001 to about 0.5 weight percent, more preferably about 0.002 to about 0.25 weight percent. If sodium chloride is used as the source of chloride ions, the final concentration of sodium chloride is about 0.0001 to about 8.4 weight percent, preferably about 0.0001 to about 0.3 weight percent, more preferably about 0.0002 to about 0.15 weight percent. If sodium chlorate is used as the source of chlorate ions, the final concentration of sodium chlorate is about 0.0001 to about 1.4 weight percent, preferably about 0.0001 to about 0.05 weight percent, more preferably about 0.0002 to about 0.025 weight percent.

Expressed in terms of ion concentration, the concentration of chlorite ions is about 0.00075 to about 11.0 weight percent (w/w), preferably about 0.00075 to about 0.37 weight percent, more preferably about 0.0015 to about 0.19 weight percent. The concentration of chloride ions is about 0.00006 to about 5.1 weight percent, preferably about 0.00006 to about 0.18 weight percent, more preferably about 0.00012 to about 0.091 weight percent. The concentration of the chlorate ions is about 0.000078 to about 1.1 weight percent, preferably about 0.000078 to about 0.039 weight percent, more preferably about 0.00016 to about 0.020 weight percent.

The relative concentration of ions may also be expressed in molar ratios. Preferably, the molar ratio of chlorite ion to chlorate ion is in the range of from about 0.0008:1 to 170,000:1, more preferably about 0.09:1 to about 1500:1; the molar ratio of chlorite ion to chloride ion is in the range of from about 0.00008:1 to 95,000:1, more preferably about 0.009:1 to about 800:1; and the molar ratio of chloride ion to chlorate ion is in the range of from about 0.0001:1 to about 150,000:1, more preferably about 0.01:1 to about 1400:1.

As noted above, the pH of the aqueous solution is at least about 6.0 or higher. As would be understood in the art, the pH of the solution may be adjusted by the addition of any of a number of pH-adjusting materials known in the art. For example, sodium hydroxide or other alkali metal hydroxides can be used to adjust pH.

In order to maintain the desired pH level of the solution over time, it is preferable to also add one or more buffering agents to the solution. The buffering agent may be any known buffering agent capable of providing a pH buffering effect in the pH range of the solution. The concentration of the buffering agent can range from 0 weight percent up to the saturation level of the solution. The preferred buffer concentration is in the range of about 0 to about 2.3 weight percent, preferably about 0 to about 0.09 weight percent, more preferably about 0.0002 to about 0.045 weight percent. Suitable buffering agents include phosphates, such as monopotassium phosphate, sulfates, such as sodium sulfate, borates, such as sodium tetraborate decahydrate, and the like. Multiple buffering agents may be used in a single solution. In one embodiment, sodium sulfate is present in an amount of about 0 to about 0.6 weight percent, preferably about 0 to about 0.02 weight percent, more preferably about 0.0001 to about 0.01 weight percent; sodium tetraborate decahydrate is present in an amount of about 0 to about 0.6 weight percent, preferably about 0 to about 0.02 weight percent, more preferably about 0.0001 to about 0.01 weight percent; and monopotassium phosphate is present in an amount of about 0 to about 1.1 weight percent, preferably about 0 to about 0.05 weight percent, more preferably about 0 to about 0.025 weight percent.

In addition to pH adjustment and buffering, additional steps may also be taken to retard the release of chlorine dioxide in the present invention. Chlorine dioxide-inhibiting agents useful in retarding the formation of chlorine dioxide may also be added to the solution in order to prevent chlorine dioxide release. Suitable inhibiting agents include peroxides, borates, perborates, and percarbonates. Exemplary inhibiting agents include hydrogen peroxide and sodium tetraborate decahydrate. Multiple inhibiting agents may be used. One preferred embodiment includes the use of hydrogen peroxide to retard the formation of chlorine dioxide. The preferred concentration of hydrogen peroxide is about 0 to about 0.15 weight percent, more preferably about 0.00001 to about 0.005 weight percent.

It should be noted that the scope of the invention is not confined solely to the utilization of compositions comprising chloride, chlorite and chlorate ions. Other compositions within the scope of the invention are comprised of other halide and pseudohalide (for example, thiocyanate) components and provide effective alternatives to oxychlorine chemistry. It is further anticipated that combinations of mixed halides and oxyhalides will also be effective.

Once the dilute liquid aqueous biocidal composition is prepared, the dilute solution may then be frozen using any cooling means known in the art, thereby forming a solid biocidal composition that can be generically referred to as ice. The ice is then contacted with the perishable article. The frozen solution may be contacted with, or applied to, the perishable article in any number of ways known in the art. In one embodiment, the biocidal composition is frozen into blocks of ice. Fish, or other perishable articles, are then contacted directly with the frozen blocks. In another embodiment, the frozen biocidal composition is broken into smaller pieces to obtain a particulate form, such as crushed or shaved ice. The particulate form is then applied to the perishable article in sufficient amount to retard spoilage and extend the useful life of the article. In this form, the frozen biocidal composition could be made available to fishermen for use on boats such that the frozen composition is applied directly to fish as they are caught.

In yet another embodiment, the biocidal composition is applied to the perishable article in liquid form, prior to freezing. The composition could be applied by spraying directly onto the perishable article or by submerging the perishable article in the composition. The article and composition are then frozen together. If the perishable article is submerged, the product is completely frozen within the solid ice block of the biocidal composition.

In one aspect of this embodiment, the frozen composition having the article frozen inside, is then melted. A subsequent frozen aqueous solution is provided, preferably in particulate form. The frozen solution in particulate form is applied to the article in a sufficient amount to preserve the article or extend the shelf life of the article.

In any of the embodiments described herein, the perishable article may first be contacted with the liquid form of the biocidal composition prior to contact with the frozen composition. Specifically, the biocidal composition may be used as a rinse, spray, wash, or bath treatment for the perishable article prior to freezing or contact with the frozen biocidal composition to aid in the preservation process.

In order to demonstrate the biocidal properties of the compositions, the following examples are offered. It should be appreciated that these are merely examples to show the utility and effectiveness of the compositions. The inclusion of these examples should not be interpreted in any manner as limiting the scope of the present invention to the conditions set forth in the examples with regard to the proportions as well as final concentrations and quantities of the ingredients, nor should these examples be regarded as limiting with regard to the treatment regimen of the inventive method. Similarly, the disclosure of these examples should not be interpreted in any manner as limiting the scope of the compositions solely to those containing chlorine and oxychlorine species.

EXAMPLE 1

A biocidal composition was prepared by mixing 4,727 g of sodium chlorite (31%) in 4 liters of deionized water. 842 g of sodium chloride and 142 g of sodium chlorate were then added to the aqueous mixture. 60 g of sodium sulfate and 60 g of sodium tetraborate decahydrate were then added and the mixture was stirred for approximately 15 minutes until all of the solids had dissolved. 43 g of hydrogen peroxide (35%) were then added and the solution was mixed for approximately five minutes. The pH of the mixture was adjusted to 8.5 by slowly adding monopotassium phosphate to the solution. The solution was filtered to remove any contaminants and/or sediment and the filtrate was collected for use as a biocidal material.

The resulting filtrate from the above steps had a specific gravity of 1.22. The chlorite ion was present in an amount of 10.9 weight percent (109,000 ppm). The chlorate ion was present in the amount of 1.11 weight percent (11,100 ppm) and the chloride ion was present in an amount of 5.1 1 weight percent (51,000 ppm). In Examples 2–10 below, the tests were carried out with the composition of Example 1 further diluted with water as specified in each example. The concentrations set forth in the following examples refer to the final concentrations of sodium chlorite after dilution. The following studies were performed to demonstrate the biocidal and preservative efficacy of the oxyhalogen, non-chlorine dioxide generating intermediates.

EXAMPLE 2

The composition of Example 1 was diluted with potable water such that the sodium chlorite concentration was 122 ppm, and tested for effectiveness in preserving "fresh fish", meaning the fish is not frozen into a block of ice after harvest. The treated water was frozen into ice blocks at temperatures consistent with industry standards. The ice was then chaffed to form crushed ice for application to fresh fish. All fish samples were haddock fillets and weighed at least one pound. The fish were divided into a test group and a control group. Each fish in the test group was washed with the composition of Example 1 diluted to 122 ppm sodium chlorite and each fish in the control group was washed with untreated water. Samples were taken from the fish to be cultured to determine microbial contamination prior to washing. The one-pound samples were then placed in a fashion as to allow the crushed ice to contact all surfaces of the fish. The control fish were contacted with ice formed from untreated water and the test fish were contacted with ice formed from the treated water at the dilutions described above. Fresh ice was added to the samples to insure complete coverage at all times. The fish were maintained at temperatures consistent with fresh seafood displays and conformed to industry standards. Tissue samples were removed for analysis at 24-hour intervals, until the end points were reached that indicated the product was not safe for human consumption. At that time, the samples were removed from the treatment groups and the reason for the removal identified. Along with microbial samples, an organoleptic assessment of the product was made.

As shown in FIG. 2, it took 18 days for the test samples to reach an odor score of about 4.5. Human sensory panels usually reject fish having an odor score of 4.5, therefore it is the baseline for odor evaluation. As shown in FIG. 1, the control group only took 12 days to reach a score of 4.5. The TMA value, a chemical index for spoilage, is a function of bacterial metabolism. The TMA is shown in each figure in terms of grams per tissue. FIG. 1 shows the TMA of the control group and FIG. 2 graphs the TMA of the test group. The test group, after 21 days shows a TMA value of less than half that of the control group. This indicates that either the spoilage flora is altered or the metabolism of the spoilage organisms is altered so that less trimethylamine oxide in the tissue is converted to TMA. Bacterial counts are also shown in FIGS. 1 and 2 for the control and test groups respectively.

EXAMPLE 3

The composition of Example 1 was diluted with potable water such that the sodium chlorite concentration was 245 ppm, and tested for effectiveness in preserving "fresh fish", using the same method as described in Example 2. The results of this test are shown in FIG. 3. As shown in FIG. 3, the odor score did not fall below the acceptable value until about 25 days. Additionally, after 27 days the TMA value is only about half of the TMA value of the control fillets after 12 days as shown in FIGS. 3 and 1, respectively.

EXAMPLE 4

The composition of Example 1 was diluted with potable water and tested for effectiveness in preserving fresh haddock fillets. Fresh haddock was obtained from a coastal processor shortly after processing, each fillet weighing about 500 g, and approximately 30 cm long. The haddock were divided into four groups, each group consisting of five haddock fillets. The composition of Example 1 was diluted with potable tap water to produce 0 ppm (control), 122 ppm, 183 ppm and 245 ppm sodium chlorite solutions. Each fillet was then dipped into the respective treatment for 1 minute and then frozen in pans. The freezing method consisted of first preparing a bottom 7 cm layer of ice at −20° C. Each fillet was then placed on the layer of ice with at least 2 cm clearance on each side. Chilled water at 0° C. was added to a height of 7 cm above the fillet. Both the bottom layer of ice and the chilled water contained a predetermined level of sodium chlorite corresponding to sodium chlorite concentration in the initial dipping water. The pans were then placed in a freezer at −20° C.

All samples were maintained frozen (−20° C.) for seven days and then thawed at room temperature to 0° C. Thawing was rapid and included chipping most of the surrounding ice from the fillets. The fillets were immersed in tap water so that no more than 0.5 cm surrounding ice remained. The fillets remained at ambient temperature (20° C. to 25° C.) until the loss of frozen rigidity occurred. The fillets were then stored in ice (−2° C.) containing the corresponding level of sodium chlorite Assays including bacterial counts, odor, and trimethylamine (TMA) were determined every six days. CFU (represented as log CFU/g) were determined before dipping, after dipping and after freezing and thawing, and were obtained until odor scores were below 4.0. A trained panel using the 10 point hedonic scale performed odor evaluation. The scale ranges from 10 (fish, seaweedy odors) to 0 (nauseating, putrid, fecal odors, indole, ammonia, etc.). Formation of TMA is due to the action of developing bacteria, the TMA content being associated with bacterial growth and metabolism. The quantitative TMA in fish is considered a major index of the quality of spoilage of marine fish. TMA content was expressed as mg TMA-N 100 $g^{-1}$ fish tissue.

The mean bacterial counts of the control fillets before and after dipping were 4.79 and 4.74 respectively. No significant difference (p>0.05) was observed. Dipping in 122, 183, and 245 ppm sodium chlorite solutions for 1 minute resulted in significant reductions (p>0.05) in bacterial populations. The bacterial counts were respectively reduced from 5.48, 6.31 and 5.45 before dipping to 5.00, 5.28, and 4.50 after dipping. The sodium chlorite solution exhibited a rapid biocidal activity towards a significant number of contaminating bacterial flora on the fillets. A significant reduction (p>0.05) in bacterial counts was also observed in 245 ppm sodium chlorite solution after freezing for seven days.

The mean CFU for the control fillets increased significantly (p>0.05) throughout the storage period, and reached a maximum value of 9.67 after 18 days of iced storage. In contrast, the same mean CFU level for fillets treated and stored in ice containing 122, 183, and 245 ppm sodium chlorite was not reached until after 30, 30, and 42 days respectively. These results indicate that bacterial growth was obviously inhibited during storage in ice containing sodium chlorite when compared to the control fillets and that the inhibitory effect was greatest with 245 ppm sodium chlorite. The mean CFU level for all groups is shown in FIG. 4.

The mean rate of TMA formation with samples stored in treated ice at all levels was notably reduced compared to the mean of the controls as shown in FIG. 5. The mean TMA content of the controls increased more rapidly than that of the samples stored on treated ice, reaching a mean value of about 5.7 mg TMA-N 100 $g^{-1}$ after 18 days storage. This value is approximately 5 fold higher than the mean of samples stored in treated ice for the same storage period. After 30 days of storage, the mean TMA-N content of fillets stored in ice containing 122, 183, and 245 ppm sodium chlorite were 2.5, 2.4, and 0.7 mg TMA-N 100 $g^{-1}$ respectively.

The mean sensory data of the control and fillets stored in treated ice are shown in FIG. 6. The mean odor scores of the control group declined rapidly, after the first six days and reached a value of about 7.0 after storage for 12 days. In contrast, a mean odor score of 7.0 was not reached with the samples stored in ice containing 122, 183, and 245 ppm sodium chlorite until after 24, 24, and 30 days respectively. A mean sensory score of 7.0 corresponded with the first detection of malodors by the panel.

EXAMPLE 5

Live hybrid striped bass were harvested from an aquaculture operation and placed in an untreated ice water slurry. The fish were removed from the slurry after 4 hours and subjected to the following treatments. Three fish were used for each treatment and control groups. The control group consisted of a one-minute dip in 72° F. (about 22° C.) distilled water. Treatments consisted of both one-minute and one-hour dips in 61 ppm, 92 ppm and 183 ppm sodium chlorite dilutions of the composition described in Example 1. Room temperature (about 22° C.) was used for one-minute dips and chilled water (about 4° C.) was used for one-hour treatments. After the treatments, each fish was photographed, visually scored for three quality attributes, wrapped in polyethylene and stored on aluminum trays in a 4° C. cooler. Visual scoring was based on a scale of 1 to 5, with 1 being decomposed and 5 being fresh. The fish were removed from the cooler at two-day intervals, scored for quality attributes, photographed and returned to the cooler. Observations were recorded at Day 0, 2, 4 and 6. The samples were unfit for human consumption after Day 6. No detrimental effect on the appearance of fish treated with the composition of Example 1 was observed compared to controls after six days. The visual scoring reports are shown in FIG. 7.

EXAMPLE 6

The composition of Example 1 was diluted and tested for its efficacy in extending the shelf life of farm-raised hybrid striped bass. Pond-raised hybrid striped bass were obtained from various growers. The fish were harvested live using standard commercial practices. Fingerlings (approximately 100 g) and market size fish (approximately 568–908 g) were obtained, euphemized in ice water, and transported on ice to the seafood processing laboratory conducting this study. The whole fish were held on ice and stored under mechanical refrigeration at approximately 2° C.

Whole fish were evaluated for total aerobic plate counts by use of a surface swabbing technique. A 9-$cm^2$ area on the skin of each fish was swabbed using BBL Culture Swabs. Swabs were inserted into 1% peptone water, vortexed and plated on 3M Petrifilm Aerobic Plate Count (APC) plates and incubated at 37° C. for 48 hours. Plates were counted after 48 hours incubation period and the APC/$cm^2$ was calculated.

A control group was used to establish a baseline for quality attributes. Nine whole fish were obtained; four were randomly selected and the gills and gut portions removed (drawn). Five whole fish and four drawn fish were rinsed, re-iced and stored on ice under refrigeration. Fish were removed from storage on days 1, 3, 6, 8, 10, 13 and 15 for sensory evaluation and microbial determination.

Dose trials were performed to determine the effective dose for sodium chlorite treatment. Two hundred fingerlings, averaging 100 g each, were transported to the seafood processing laboratory within 3 hours of harvest. The sodium chlorite solution of Example 1 was diluted with water in 90 qt insulated ice chests. Three dilutions were prepared: 61 ppm, 183 ppm, and 1830 ppm sodium chlorite. A control of water only was also prepared in the same manner.

Fish were placed into plastic mesh bags, three to each bag. All bags were placed in the ice chests according to concentration and were mildly agitated during the first 30 seconds to provide a thorough rinse. Fish were removed from the solutions after the prescribed exposure time and packed on ice. Exposure times were 5, 30 or 60 minutes. The ice chests were placed in a walk-in cooler for storage and the drain on each ice chest was left open to allow for ice melt.

The fish were then tested for aerobic plate counts (APC/ml) on days 1, 4, 7, 11, 13, and 15. A bag of three fish from each treatment and the controls was removed for microbial testing. Fish from each treatment were placed in a sterile plastic bag and weighed. Buffered 1% peptone water was added, providing a 1:1 dilution. The fish were vigorously agitated for thirty seconds. Dilutions were made and plated.

The fish immersed in 61 ppm and 183 ppm sodium chlorite solutions did not show reduced levels of bacteria compared to the untreated control. When comparing the levels of fish immersed in 1830 ppm sodium chlorite solution to the untreated control, the bacterial load was slightly less. Treatment with 1830 ppm sodium chlorite solution may have a bacterial disinfectant effect. The length of exposure did not appear to have an effect.

EXAMPLE 7

The composition of Example 1 was diluted and tested for its efficacy in extending the shelf-life of fresh, whole hybrid striped bass when used in ice. The same parameters evaluated in Example 6 were also evaluated in this study. Live hybrid striped bass were harvested from an aquaculture operation and placed in an ice water slurry. The composition of Example 1 was diluted and pumped directly into an ice machine. Dilutions included 0 ppm (control), 122 ppm, 245 ppm and 610 ppm sodium chlorite. Crushed ice was thus made containing the diluted sodium chlorite solutions. The fish were packed on ice made from the dilutions two per box in waxed cardboard boxes. The samples were then transported to the seafood processing laboratory conducting this study. Additional ice was added to each box before storing them in a walk-in cooler. Samples were re-iced once per week with corresponding concentrations of ice. Samples were analyzed on days 1, 13, 15, 17, 20, 22 and 24 for sensory attributes and microbiological quality.

Microbial levels were maintained at the same level from day 1 to day 13 in samples from the 610 ppm treatment. Overall, treated samples appeared to have lower APC cfu/g throughout the study. The results of studies represented in Examples 6 and 7 show that treating whole fish with the sodium chlorite solution and subsequent storage on untreated ice provides little effect on controlling microbial levels on the fish. However, when ice is impregnated with the sodium chlorite solution, a positive effect in appearance and microbial levels is shown. In this study, the ice made from sodium chlorite solutions did not contain concentrations as high as the original solutions. The problem was traced to the efficiency of the ice machine in the conversion of liquid to ice. Not all of the liquid was frozen and the non-frozen portion contained higher concentrations of chlorite and never came in contact with the fish. An additional study was conducted, and is discussed in Example 8.

EXAMPLE 8

The composition of Example 1 was diluted and tested according to Example 7. The control group was held on ice made from tap water. The test group was held on ice made from solutions containing 250 ppm sodium chlorite. Due to the problems with the ice machine described in Example 7, the solutions were sealed in plastic bags and frozen prior to use. The ice was broken into pieces (non-uniform) and used to pack the fresh fish. Both groups were kept on ice for 20 days. Each fish was tested for bacterial growth on day 1, 13, and 20. No difference in bacterial counts occurred at Day 1. At day 13, a near 2-log reduction was obtained in the treated samples. By day 20, a 1+-log reduction was obtained in the treated samples.

EXAMPLE 9

The composition of Example 1 was diluted and tested for its efficacy in preserving various seafood, including shrimp. In all tests, the composition of Example 1 was diluted with chilled tap water (38° F. or approximately 3° C.) to a final concentration of 36.6 ppm sodium chlorite. The composition was then rapidly frozen in a −20° F. (approximately −28° C.) freezer. The ice was broken up into a slush mixture. All treatments, including controls were placed in fresh normal flaked ice for overnight cold storage at 42° F. (5° C.). Normal flaked ice was obtained from a flake ice machine. All seafood and fruit and vegetable produce were fresh, less than two days old. The shrimp were harvested, deheaded, frozen and packaged at a commercial shrimp processing facility.

Total aerobic plate count assays were conducted using 3M Petrifilm. Petrifilms were incubated at 35° C. for 24 hours, then counted and recorded as CFU/g of seafood or CFU/ml ice or $CFU/cm^2$ surface area of produce. Petrifilms were incubated at room temperature (22° C.–23° C.) for four to five days, then counted and recorded as CFU/g of seafood or ice or $CFU/mm^2$ of produce. Statistical analysis was performed using a standard t-test.

Commercial controls for the grouper, tuna, salmon, and shrimp consisted of normal treatment of the seafood including an ice slush rinse both before placing into and removal from the commercial display case. All seafood was then packed in normal ice and stored overnight in a refrigerator (approximately 5° C.). Each day the seafood was removed and placed into the refrigerated commercial display case (5° C.).

Grouper, tuna, and salmon fillets and shrimp were used in this study. Each study contained three test groups. Each group was treated with an ice slush rinse and then placed in a commercial display case. Ice slush consists of ice and cold water. Treatments were performed daily and all fillets or shrimp were placed in fresh normal flaked ice for overnight storage at 5° C. to 7° C. Group I was the control group and was treated only with an ice slush rinse. Group II was treated with the diluted composition described above as a rinse prior to the non-treated ice slush rinse. Group III was treated with an ice slush comprising the diluted composition described above and placed on ice comprising the same diluted solution. Group IV consisted of treated ice flakes comprising the diluted sodium chlorite composition described above. Group IV was only tested for total aerobic plate count of the melted ice. Group V consisted of non-treated ice flakes and, like Group IV was only analyzed for total aerobic plate count of the melted ice. No fillets or shrimp were used in Groups IV and V. The results of this study are represented in Tables 1–4 below. In each of the studies, ice treated with the sodium chlorite solution exhibited statistically significant lower aerobic plate counts than non-treated ice.

TABLE 1

Grouper Fillets

| Time of Refrigerated Storage | Group I* | Group II* | Group III* | Group IV** | Group V** |
|---|---|---|---|---|---|
| Day 0 | 2400 | 1100 | 970 | 45 | 90 |
| Day 2 | 3500 | 2560 | 2400 | 23 | 112 |
| Day 4 | 4400 | 3500 | 3000 | 56 | 98 |
| Day 7 | 9000 | 4500 | 4900 | 26 | 143 |
| Day 10 | 1600 | 800 | 1300 | 42 | 121 |
| Day 14 | TNC | 1000 | TNC | 68 | 234 |

*Values are reported as CFU/g of grouper fillet.
**Values are reported as CFU/g of melted ice.
TNC = too numerous to count.

All samples were unacceptable organoleptically (smell and appearance based) at Days 10 and 14. Normal grouper fillet shelf-life is approximately 3 to 4 days. Aerobic plate counts increased on the surface of grouper fillets regardless of the treatments. However, treatments using a cold water rinse or an ice slush containing the diluted sodium chlorite composition reduced the surface aerobic plate count when compared to the normal ice slush treatment. The differences were statistically significant in all but Day 4 of Group II, Day 10 of Group III and Day 14 in both Groups II and III.

TABLE 2

Tuna Fillets

| Time of Refrigerated Storage | Group I* | Group II* | Group III* | Group IV** | Group V** |
|---|---|---|---|---|---|
| Day 0 | 250 | 110 | 157 | 45 | 90 |
| Day 2 | 340 | 2560 | 340 | 23 | 112 |
| Day 4 | 480 | 3500 | 500 | 56 | 98 |
| Day 7 | 1200 | 1400 | 890 | 26 | 143 |
| Day 10 | 1560 | 1600 | 1300 | 42 | 121 |
| Day 14 | TNC | TNC | TNC | 38 | 234 |

*Values are reported as CFU/g of tuna fillet.
**Values are reported as CFU/g of melted ice.
TNC = too numerous to count.

The tuna fillet shelf life is four days. All samples were unacceptable organoleptically at Day 14. Aerobic plate counts on the surface of tuna steaks increased over time regardless of the treatments. Differences between the treated groups versus untreated groups were statistically significant through Day 4 (p=0.01).

TABLE 3

Shrimp (headless, shell on)

| Time of Refrigerated Storage | Group I* | Group II* | Group III* | Group IV** | Group V** |
|---|---|---|---|---|---|
| Day 0 | 1120 | 600 | 570 | 45 | 90 |
| Day 2 | 1300 | 1150 | 890 | 23 | 112 |
| Day 4 | 3800 | 3200 | 1200 | 56 | 98 |
| Day 7 | 6400 | 6100 | 3900 | 26 | 143 |
| Day 10 | 11600 | 12000 | 5800 | 42 | 121 |
| Day 14 | TNC | 10000 | 6000 | 28 | 164 |

*Values are reported as CFU/g of shrimp.
**Values are reported as CFU/ml of melted ice.
TNC = too numerous to count.

The shrimp samples were unacceptable organoleptically (smell and appearance) at Days 10 and 14. Headless shell on shrimp shelf life is typically 5–6 days. Differences in plate counts were significantly different (p=0.01) in Group III until Day 14.

TABLE 4

Salmon Fillets

| Time of Refrigerated Storage | Group I* | Group II* | Group III* | Group IV** | Group V** |
|---|---|---|---|---|---|
| Day 0 | 520 | 100 | 270 | 45 | 90 |
| Day 2 | 1300 | 150 | 690 | 23 | 112 |
| Day 4 | 1800 | 1500 | 1000 | 56 | 98 |
| Day 7 | 3400 | 2300 | 1600 | 26 | 143 |
| Day 10 | 4600 | 3200 | 2700 | 42 | 121 |
| Day 14 | Not performed | Not performed | Not performed | Not performed | Not performed |

*Values are reported as CFU/g of salmon fillet.
**Values are reported as CFU/ml of melted ice.
TNC = too numerous to count.

All salmon fillets were unacceptable organoleptically (smell and appearance) at Days 10 and 14. Salmon fillets have a typical shelf life of 3–4 days. Little if any color changes were observed between the treated salmon and the control salmon. Differences in plate counts were significantly different (p=0.01) in Group III until Day 10.

EXAMPLE 10

The composition of Example 1 was diluted with tap water. A final concentration of 245 ppm sodium chlorite was prepared by adding 27.5 ml of the composition of Example 1 into 20 L of tap water. The prepared solution was poured with a three inch thickness into four plastic trays and frozen at −20° C. for three days. Chipped ice was prepared by chopping the frozen blocks into small pieces followed by storage at −3° C. for three days. The control ice was made using the same process without the addition of the sodium chlorite solution.

Fresh chicken breasts were purchased directly from a processor. Five breasts were submerged in 2 L of tap water (3° C.) containing 245 ppm sodium chlorite for one minute and then drained for 1 minute. Five control breasts were submerged in 2 L of tap water (3° C.) for one minute and then drained for one minute. Samples for odor and microbial analysis were taken by aseptically cutting 20 g from each chicken breast using sterile scissors and tweezers. The treated samples were stored on top of three inches of treated ice and were then covered with three inches of treated ice in a bag fabricated from plastic screen so as to allow free drainage of melted ice to descend below the samples. The screened bags with iced samples were stored on top of plastic racks which raised the samples four inches from the bottom of the plastic ice storage chests in which they were placed. The chests were then stored in a walk-in refrigerator at 3° C. Ice was replenished every three days. Melt water was removed every three days so that no accumulated melt water at the bottom of the chests ever contacted the samples. The control samples were stored similarly in untreated ice in a separate ice chest.

A total of 20 g was taken from each chicken breast every three days, 10 g for sensory testing and 10 g for total bacterial count determinations. A sensory panel evaluated the odor of the chicken breast tissue every three days until strong foul odors occurred. Odor was rated on a scale of from 7 to 1, with 7 representing no off odor and 1 representing a very pronounced odor.

Total bacterial counts were determined by placing 10 g of tissue in a stomacher bag with sterile 90 ml of Tryptic Soy Broth (TSB) and then stomaching for 2 minutes in a laboratory stomacher at normal speed for homogenization of the tissue. Decimal dilutions were made in TSB. Duplicate plates of Tryptic Soy Agar (TSA) were smear plated with 0.1 ml of each dilution, followed by incubation of the plates at 20° C. for three days.

FIG. 8 indicates that up to day 12 the bacterial counts in the treated and control samples were closely parallel.

Beyond 12 days, the control counts went from about $1 \times 10^6$/g to about $1 \times 10^9$/g on day 15. By day 15, the control samples had a perceptible off odor and by day 18, the control samples possessed a very strong foul odor and were not tested thereafter.

In contrast, from day 12 to day 18, the bacterial counts from the treated samples slowly increased from about $1 \times 10^6$ to about $1 \times 10^8$ and never reached $1 \times 10^9$/g even after 39 days. By day 39, the odor scores of the treated samples were still above a mean value of 6.0 indicating that detectable spoilage odors were essentially absent. Both the control and treated samples had a bacterial count of about $1 \times 10^8$/g while only the controls elicited off odors. By day 24, even though the treated samples had reached a bacterial count of about $1 \times 10^8$/g, off odor was still not present. There was no detectable difference in the appearance of bacterial colonies derived from the controls and treated samples throughout the study. These results indicated that the storage of poultry in ice containing 245 ppm sodium chlorite would more than double the time of iced storage beyond the controls.

While not wishing to be bound by any particular theory, these results suggest that the metabolism of the bacterial flora developing on the treated samples is essentially identical to that of the controls but, that the bacterial cells on the treated samples are under significant metabolic stress due to the contact with the sodium chlorite and may be significantly impaired in terms of their production of spoilage enzyme or in their transport of substrates into the cells.

EXAMPLE 11

A biocidal composition was prepared by mixing 4,742 g of sodium chlorite (31%) in 4.9 liters of deionized water. 125 g of sodium chloride and 100 g of sodium chlorate were then added to the aqueous mixture. 48 g of sodium sulfate and 48 g of sodium tetraborate decahydrate were then added and the mixture was stirred for approximately 15 minutes until all of the solids had dissolved. 40 g of hydrogen peroxide (35%) were then added and the solution was mixed for approximately five minutes. The solution was filtered to remove any contaminants and/or sediment and the filtrate was collected for use as a biocidal material. The pH of the final solution was 11.5.

The resulting filtrate from the above steps had a specific gravity of 1.14. The chlorite ion was present in an amount of 11.0 weight percent (110,000 ppm). The chlorate ion was present in the amount of 0.78 weight percent (7800 ppm) and the chloride ion was present in an amount of 0.76 weight percent (7600 ppm). In the following example, the tests were carried out with the composition of Example 12 further diluted with water as specified in each example. The concentrations set forth in the following example refer to the final concentrations of sodium chlorite after dilution. The following study was performed to demonstrate the biocidal and preservative efficacy of the oxyhalogen, non-chlorine dioxide generating intermediates.

EXAMPLE 12

The composition of Example 11 was diluted and tested according to the protocol of Example 7 for efficacy in preserving fresh, whole market size hybrid striped bass. Market size hybrid striped bass were kept on ice for 20 days. Each fish was tested for bacterial growth on day 1, 13, and 20. Ice was made from solutions containing 250 ppm sodium chlorite. A control was made from tap water. The solutions were sealed in plastic bags and frozen prior to use. The ice was broken into pieces (not uniform) and used to pack the fresh fish. No difference in bacterial counts occurred at Day 1. At day 13, a near 2-log reduction was obtained in the treated samples. By day 20 a 1+-log reduction was obtained in the treated samples. Similar results are shown in Example 8 using the composition of Example 1.

Many modifications and other embodiments of the invention will come to mind to one skilled in the art to which this invention pertains having the benefit of teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A biocidal composition comprising a frozen aqueous solution, said frozen aqueous solution comprising a biocidally effective amount of at least one halide ion, at least one oxyhalide ion, and a chlorine dioxide-inhibiting agent selected from the group consisting of peroxides, borates, perborates, and percarbonates, wherein the pH of the frozen aqueous solution is at least about 6.0.

2. The composition of claim 1, wherein the halide and oxyhalide ions are chloride and oxychloride ions.

3. The composition of claim 1, wherein said solution comprises water, a source of chloride ions, a source of chlorite ions, a source of chlorate ions, and said chlorine dioxide-inhibiting agent.

4. The composition of claim 3, wherein the concentration of chlorite ions is in the range of from about 0.00075 weight percent to about 11.0 weight percent; the concentration of chloride ions is in the range of from about 0.00006 weight percent to about 5.1 weight percent; and the concentration of chlorate ions is in the range of from about 0.000078 weight percent to about 1.1 weight percent.

5. The composition of claim 3, wherein the chlorite ions are present in the concentration range from about 0.00075 weight percent to about 0.37 weight percent.

6. The composition of claim 3, wherein the molar ratio of chlorite ion to chlorate ion is in the range of from about 0.0008:1 to 170,000:1; the molar ratio of chlorite ion to chloride ion is in the range of from about 0.00008:1 to 95,000:1; and the molar ratio of chloride ion to chlorate ion is in the range of from about 0.0001:1 to about 150,000:1.

7. The composition of claim 3, wherein said source of chlorite ions is an alkali metal chlorite, said source of chloride ions is an alkali metal chloride and said source of chlorate ions is an alkali metal chlorate.

8. The composition of claim 7, wherein said alkali metal chlorite is sodium chlorite, said alkali metal chloride is sodium chloride and said alkali metal chlorate is sodium chlorate.

9. The composition of claim 1, wherein said chlorine dioxide-inhibiting agent is hydrogen peroxide.

10. The composition of claim 1, wherein the pH of said solution is about 6.0 to about 12.0.

11. The composition of claim 1, wherein the solution further comprises a buffering agent.

12. The composition of claim 11, wherein the buffering agent is selected from the group consisting of phosphates, sulfates, borates, and mixtures thereof.

13. A method of preserving a perishable article comprising:

providing a frozen aqueous solution comprising a biocidally effective amount of at least one halide ion, at least one oxyhalide ion, and a chlorine dioxide-inhibiting agent selected from the group consisting of peroxides, borates, perborates, and percarbonates, wherein the pH of the frozen aqueous solution is at least about 6.0; and contacting a perishable article with the frozen solution.

14. The method according to claim 13, wherein said step of providing a frozen aqueous solution comprises providing a solution comprising water, a source of chlorite ions, a source of chloride ions, a source of chlorate ions and said chlorine dioxide-inhibiting agent.

15. The method according to claim 13, wherein the perishable article is selected from the group consisting of vegetables, fruits, meat, and fish.

16. The method according to claim 13, wherein the frozen solution is provided in particulate form.

17. The method according to claim 13 further comprising the step of contacting the perishable article with an aqueous solution comprising water, a source of chlorite ions, a source of chloride ions, and a source of chlorate ions prior to the step of contacting the perishable article with the frozen solution.

18. A method of preserving a perishable article comprising:

providing a frozen aqueous solution comprising water, about 0.00075 weight percent to about 0.37 weight percent chlorite ions, about 0.00006 weight percent to about 0.18 weight percent chloride ions, about 0.000078 weight percent to about 0.039 weight percent chlorate ions, and a chlorine dioxide-inhibiting agent selected from the group consisting of peroxides, borates, perborates, and percarbonates, and wherein the solution has a pH of at least about 6.0; and contacting a perishable article with the frozen solution.

19. A method of preserving a perishable article comprising:

providing an aqueous solution comprising water, about 0.00075 weight percent to about 0.37 weight percent chlorite ions, about 0.00006 weight percent to about 0.18 weight percent chloride ions, and about 0.000078 weight percent to about 0.039 weight percent chlorate ions and wherein the solution has a pH of at least about 6.0;

contacting a perishable article with the aqueous solution;

providing a frozen aqueous solution comprising water, about 0.00075 weight percent to about 0.37 weight percent chlorite ions, about 0.00006 weight percent to about 0.18 weight percent chloride ions, about 0.000078 weight percent to about 0.039 weight percent chlorate ions, and a chlorine dioxide-inhibiting agent selected from the group consisting of peroxides, borates, perborates, and percarbonates, and wherein the solution has a pH of at least about 6.0; and contacting the perishable article with the frozen solution.

* * * * *